United States Patent [19]

White

[11] Patent Number: 5,314,101
[45] Date of Patent: May 24, 1994

[54] VAN STORAGE APPARATUS

[76] Inventor: Carter V. White, P.O. Box 427 Macedonia Rd., Ragland, Ala. 35131

[21] Appl. No.: 24,293

[22] Filed: Mar. 1, 1993

[51] Int. Cl.$^5$ .............................................. B60R 9/00
[52] U.S. Cl. ...................... 224/42.03 A; 224/42.03 R
[58] Field of Search ............... 224/42.03 A, 42.03 R, 224/309, 328, 329

[56] References Cited

U.S. PATENT DOCUMENTS

| | | | |
|---|---|---|---|
| 3,715,044 | 2/1973 | Simons | 224/328 |
| 3,923,219 | 12/1975 | Glover et al. | 224/42.03 A |
| 4,241,858 | 12/1980 | Lawroski | 224/42.03 A |
| 4,957,228 | 9/1990 | Balka | 224/42.03 A |
| 5,056,695 | 10/1991 | Giblet | 224/42.03 A |

Primary Examiner—Linda J. Sholl
Attorney, Agent, or Firm—E. Michael Combs

[57] ABSTRACT

A container assembly is arranged for mounting to a rear door portion of an associated van, wherein the container structure includes at least one door having an access to an interior container cavity, with the container including uppermost support brackets for securement of the container to an upper portion of the van door, wherein cooperative lowermost brackets mounted to the bottom wall of the container secure the container to the bumper portion of the van.

2 Claims, 4 Drawing Sheets

VAN STORAGE APPARATUS

BACKGROUND OF THE INVENTION

1. Field of the Invention

The field of invention relates to van storage apparatus, and more particularly pertains to a new and improved van storage apparatus wherein the same is directed to the ease of mounting of a container structure relative to a van assembly.

2. Description of the Prior Art

Accessory van storage is required in contemporary van construction as limited space within a van typically requires accessory storage mounted to the rear of a van, in a manner indicated in U.S. Pat. No. 5,056,695. U.S. Pat. No. 4,915,276 indicates a bracket structure mounted to a hitch organization to permit storage of components relative to a rear portion of a van.

The instant invention attempts to overcome deficiencies of the prior art by permitting the use of a carrier structure in container configuration mounted to a van rear door in an easily mounted and dismounted relationship and in this respect, the present invention substantially fulfills this need.

SUMMARY OF THE INVENTION

In view of the foregoing disadvantages inherent in the known types of van storage apparatus now present in the prior art, the present invention provides a van storage apparatus wherein the same includes a container member mounted to a rear van door employing upper and lower bracket members. As such, the general purpose of the present invention, which will be described subsequently in greater detail, is to provide a new and improved van storage apparatus which has all the advantages of the prior art van storage apparatus and none of the disadvantages.

To attain this, the present invention provides a container assembly arranged for mounting to a rear door portion of an associated van, wherein the container structure includes at least one door having an access to an interior container cavity, with the container including uppermost support brackets for securement of the container to an upper portion of the van door, wherein cooperative lowermost brackets mounted to the bottom wall of the container secure the container to the bumper portion of the van.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved van storage apparatus which has all the advantages of the prior art van storage apparatus and none of the disadvantages.

It is another object of the present invention to provide a new and improved van storage apparatus which may be easily and efficiently manufactured and marketed.

It is a further object of the present invention to provide a new and improved van storage apparatus which is of a durable and reliable construction.

An even further object of the present invention is to provide a new and improved van storage apparatus which is susceptible of a low cost of manufacture with regard to both materials and labor, and which accordingly is then susceptible of low prices of sale to the consuming public, thereby making such van storage apparatus economically available to the buying public.

Still yet another object of the present invention is to provide a new and improved van storage apparatus which provides in the apparatus and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
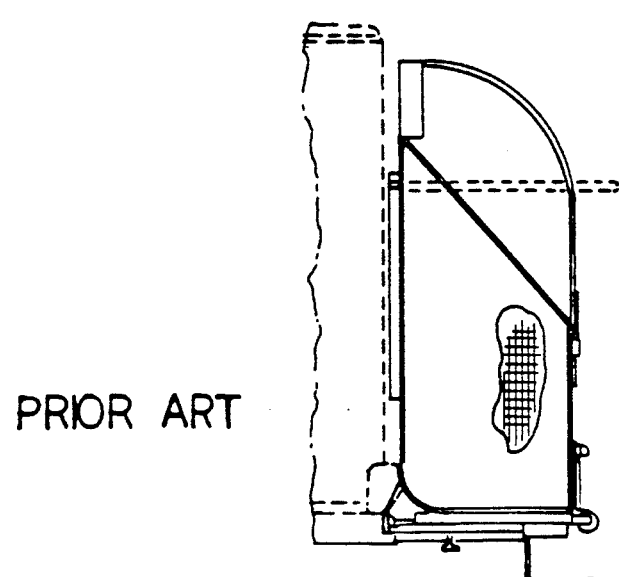
FIG. 1 is an orthographic side view of a prior art van storage structure utilizing an underlying support carrier, as indicated in U.S. Pat. No. 5,056,695.

With reference now to the drawings, and in particular to FIGS. 1 to 8 thereof, a new and improved van storage apparatus embodying the principles and concepts of the present invention and generally designated by the reference numerals 10 and 10a will be described.

Figure 2:
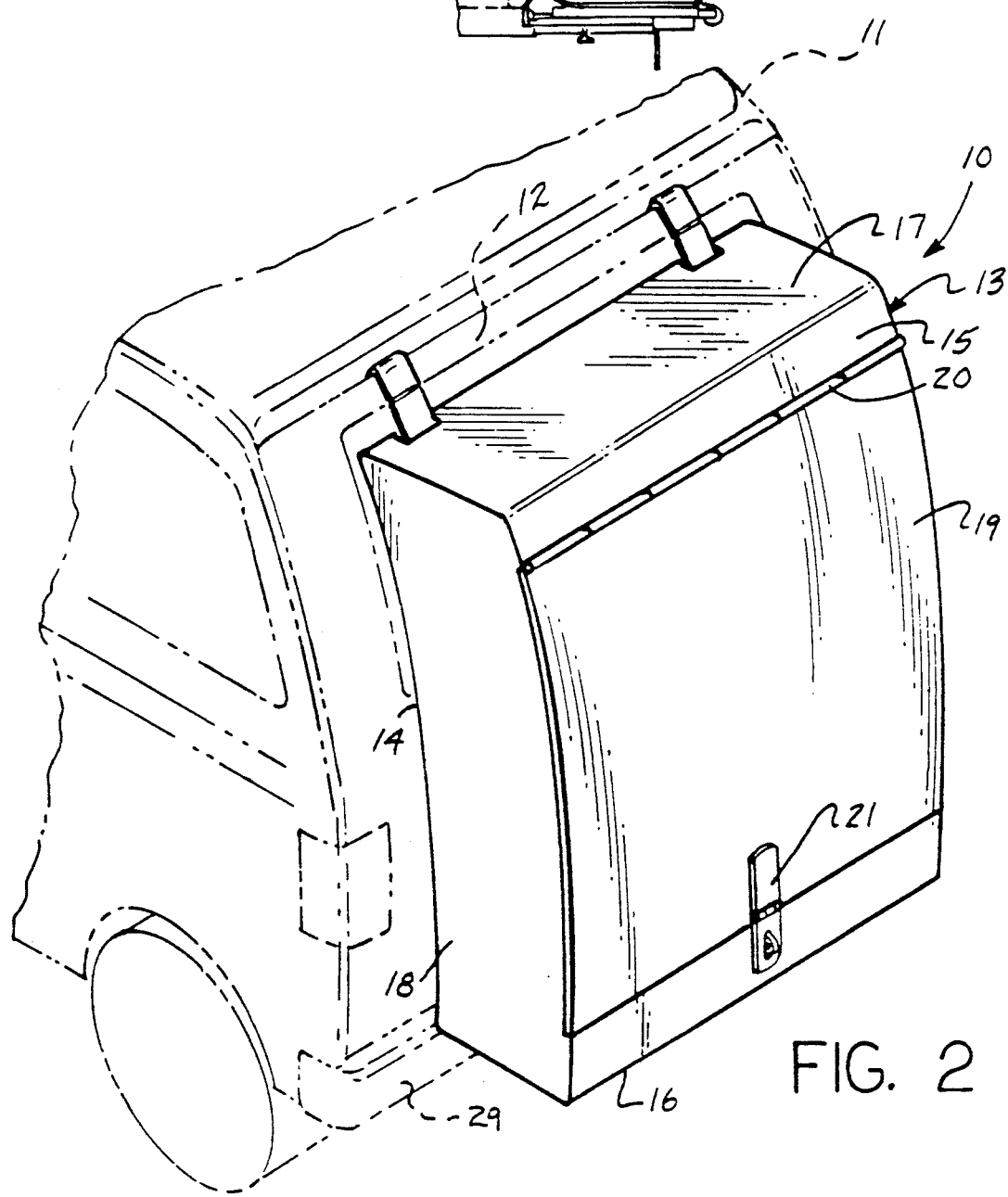
FIG. 2 is an isometric illustration of the invention.

More specifically, the van storage apparatus 10 of the instant invention essentially comprises cooperation with a van 11 having a van door 12 and a van bumper 29, as indicated in FIG. 2 for example. The apparatus includes a container 13 having a container rear wall 14 spaced from a container front wall 15, a container bottom wall 16 spaced from a container top wall 17, and spaced container side walls 18. At least one container door 19 mounted about a door hinge 20 is mounted to the container front wall 15. It should be understood that a plurality of such doors may be employed, but for purposes of convenience, only one such door 19 is indicated in the FIG. 2 of the invention.

Figure 3:
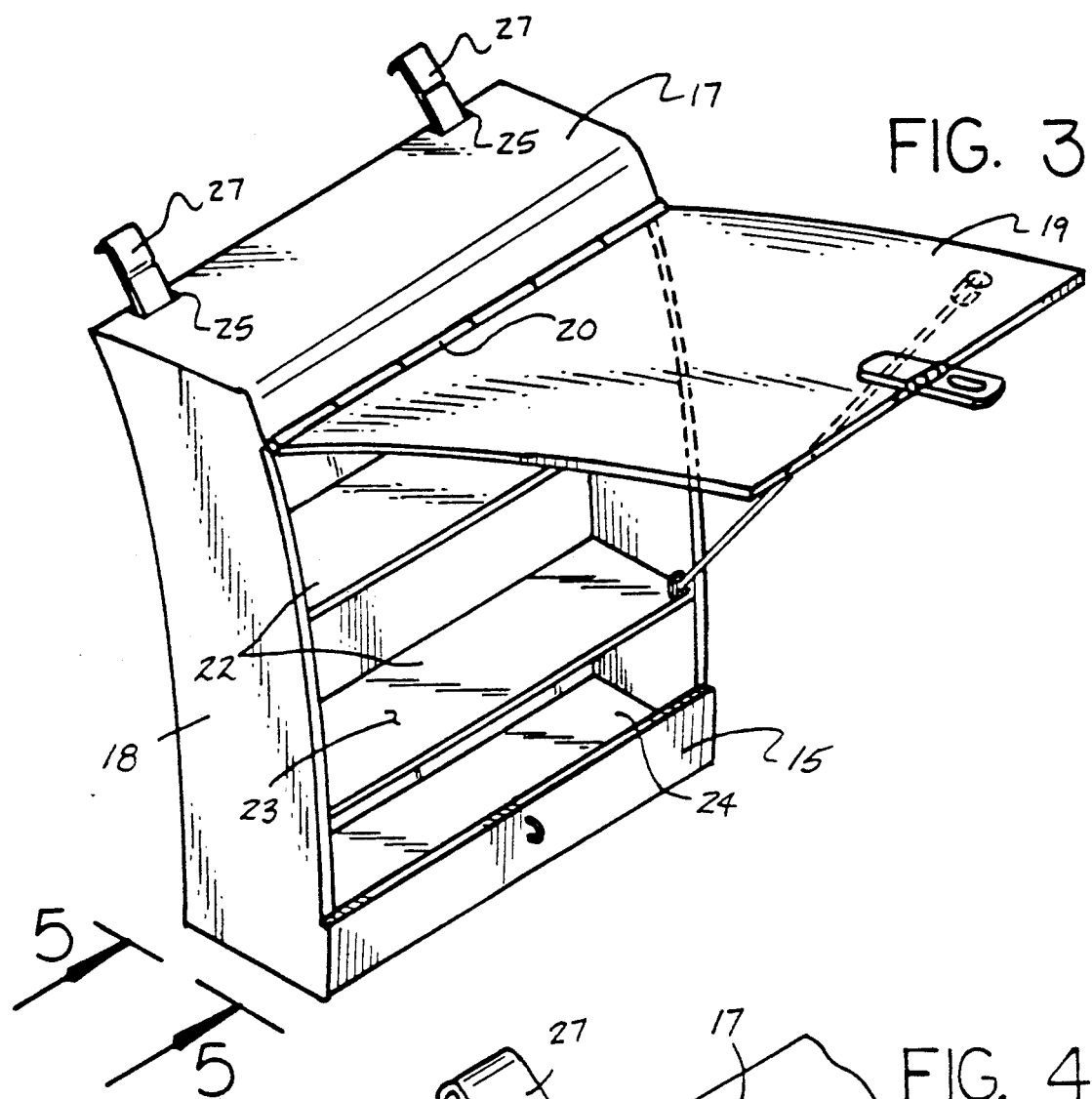
FIG. 3 is an isometric illustration of the invention in an opened configuration.
Figure 4:
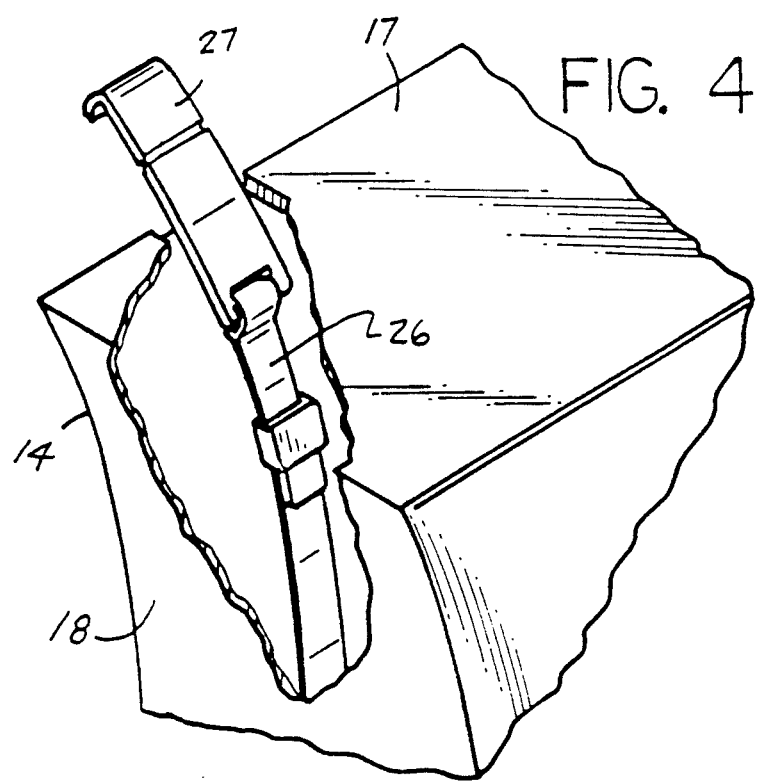
FIG. 4 is an enlarged isometric view, partially in section, indicating the uppermost brackets projecting through slot portions within the container structure.

With reference to FIG. 3, a plurality of shelf plates 22 extend orthogonally between the side walls 18, with the shelf plates 22 positioned over a cavity floor 24 of the container cavity 23. A plurality of top wall openings 25 are directed through the container top wall 15 at the intersection of the top wall to the rear wall 14. Each of the top wall openings 25 includes a support bracket 27 extending therethrough, with each support bracket mounted to a flexible anchor strap 26.

Figure 5:
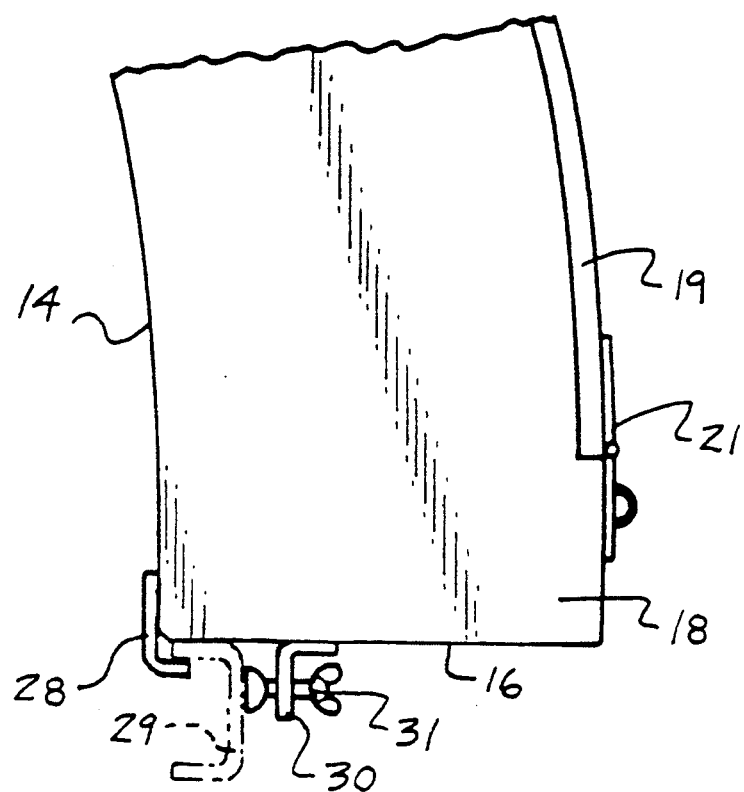
FIG. 5 is an orthographic view, taken along the lines 5—5 of FIG. 4 in the direction indicated by the arrows.
Figure 6:
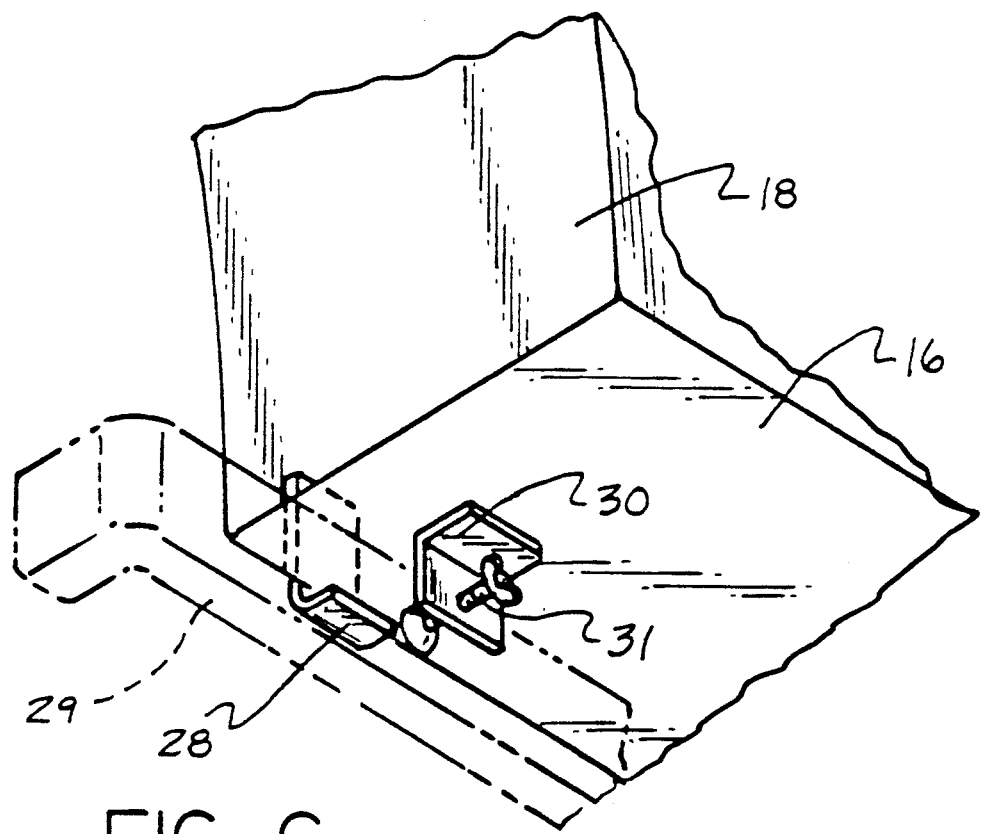
FIG. 6 is an enlarged isometric illustration of the lowermost bracket structure as employed by the invention.

The FIGS. 5 and 6 indicate that at least one first L-shaped bracket 28 is fixedly mounted to the rear wall 14 extending beyond the rear wall 14 and positioned under the bottom wall 16 for attachment to the van bumper 29. A cooperative second bracket 30 mounted to the bottom wall 16 extends orthogonally relative to the bottom wall and includes a threaded clamp rod 31 orthogonally directed through the second bracket for abutment with the van bumper 29 for mounting the container as indicated.

Figure 7:
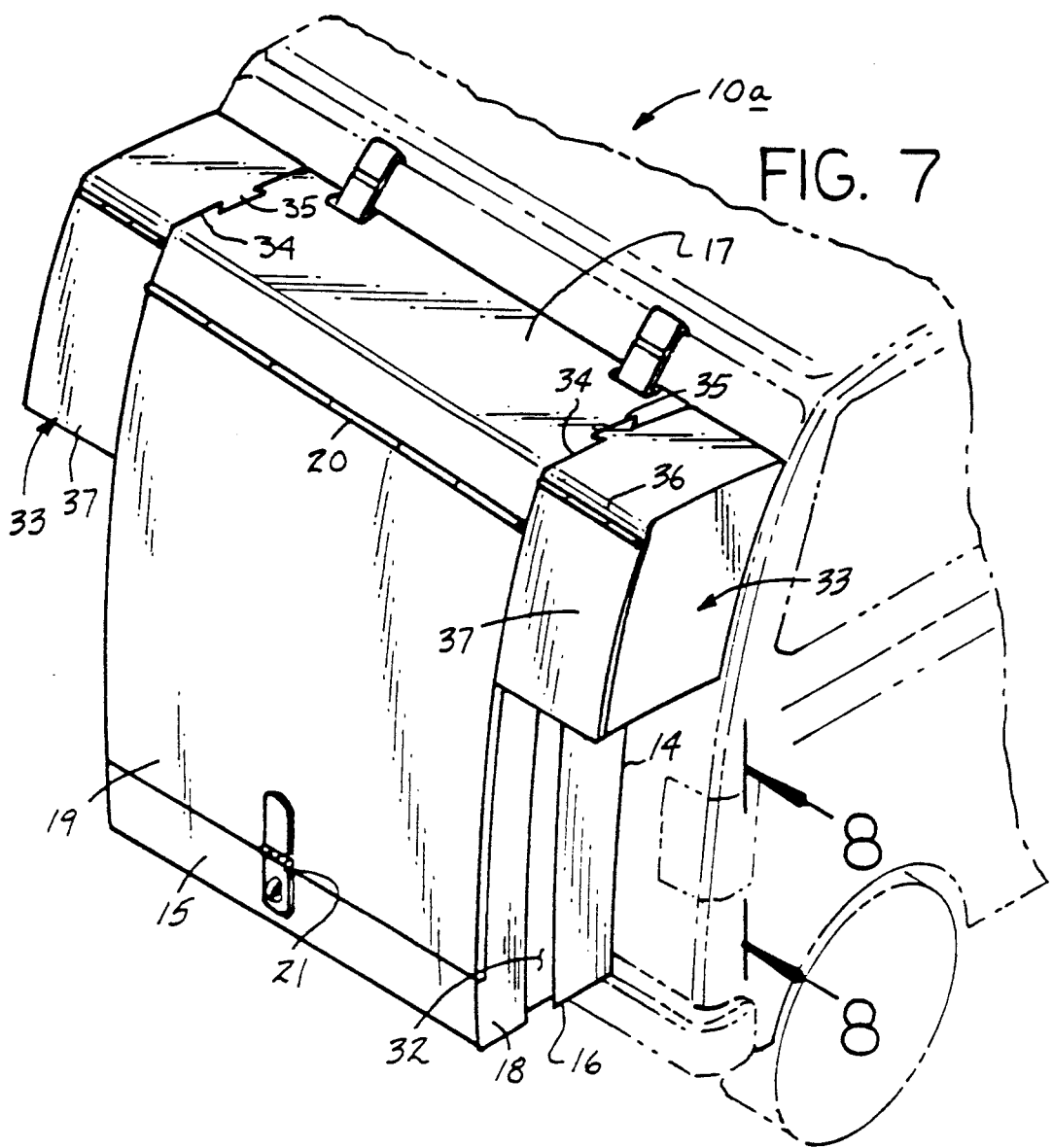
FIG. 7 is an isometric illustration of a modified container structure employing saddle containers.
Figure 8:
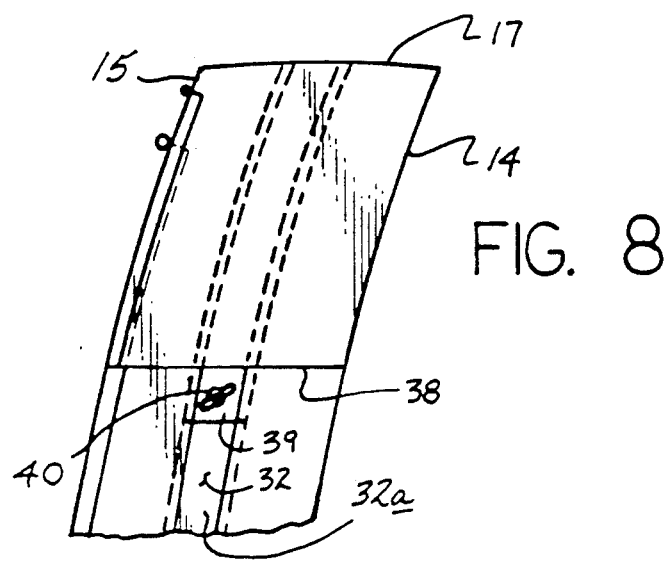
FIG. 8 is an orthographic view, taken along the lines 8—8 of FIG. 7 in the direction indicated by the arrows.

Reference to the apparatus 10a, as indicated in FIGS. 7 and 8, includes a dovetail groove 22 directed into each of the side walls 18 extending from the top wall 17 to the bottom wall 16, wherein a plurality of auxiliary saddle containers 13 are arranged for securement to the side walls 18 by the auxiliary containers having a first side wall 24, having a dovetail projection 35 to be received within the dovetail groove 32. A saddle container front wall 36 includes a front wall door 37 having hinged mounting to the auxiliary container front wall. A bottom wall 38 of each container 33 (see FIG. 8) is arranged for abutment with a dovetail lock plate 39, having a lock plate externally threaded abutment rod 40 directed through the lock plate 39. The lock plate 39 complementarily received within the dovetail groove 32 is arranged to position the lock plate abutment rod 40 into abutting engagement with the groove floor 32a to secure the lock plate 39 within the groove 32 and accordingly position the auxiliary container structure, as illustrated. The lock plate 39 accordingly in a preferred construction is integrally mounted relative to the auxiliary container and more specifically to the auxiliary container bottom wall 38 to fixedly position the associated container 33 relative to the container side wall 18.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A van storage apparatus arranged for securement to a vehicular van, having a van rear door and a van rear bumper positioned in adjacency and below the rear door, wherein the apparatus comprises, a container, the container having a container rear wall, a container front wall, a container bottom wall, a container top wall, and spaced container side walls, and a container door having a door hinge pivotally mounting the container door to the container front wall, and the container further including a container cavity accessed through the container door, wherein the container cavity includes a cavity floor and a plurality of shelf plates mounted within the cavity extending between the container side walls, and mounting means for securement of the container to the van door and the van bumper, and the mounting means includes a plurality of top wall openings directed through the container top wall in adjacency to the container rear wall, and each of the openings includes a support bracket extending therethrough, each support bracket having a hook portion for mounting to the van door, and each of the brackets includes a flexible strap positioned within the container for supporting a respective support bracket, and at least one first L-shaped bracket mounted to the container rear wall extending beyond the container rear wall and projecting in a spaced relationship in adjacency to the container bottom wall, and a second bracket fixedly and orthogonally mounted to the container bottom wall, having a threaded clamp rod threadedly directed in an orthogonal relationship relative to the second bracket, wherein the first L-shaped bracket and the second bracket are adapted to secure the van bumper therebetween.

2. An apparatus as set forth in claim 1 wherein each of the container side walls includes a dovetail groove, and each dovetail groove includes an auxiliary saddle container, each saddle container having a saddle container first side wall, and each saddle container first side wall including a dovetail projection arranged for reception within one of said dovetail grooves, and each saddle container having a saddle container bottom wall, and each saddle container bottom wall including a lock plate fixedly mounted to said saddle container bottom wall, and each lock plate having a dovetail configuration received within the dovetail groove, and each dovetail lock plate including a lock plate externally threaded abutment rod threadedly directed through the lock plate, and each dovetail groove including a groove bottom wall, and the abutment rod arranged for engagement with the groove bottom wall.

* * * * *